(No Model.)
C. ENDICOTT.
DIRT SCRAPER.
No. 291,585. Patented Jan. 8, 1884.
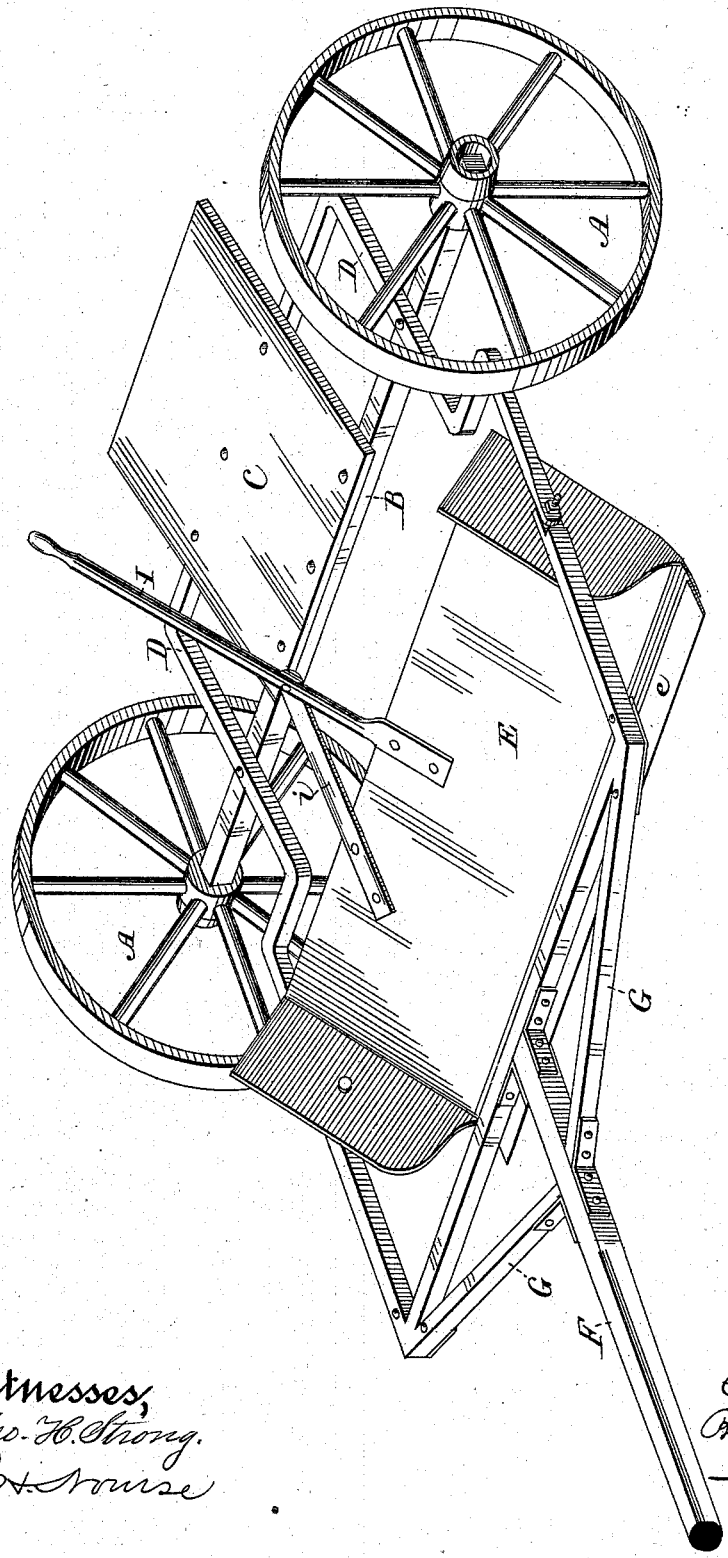
Witnesses,
Geo. H. Strong.
Inventor,
Chas Endicott
By Dewey & Co.
Attorneys

UNITED STATES PATENT OFFICE.

CHARLES ENDICOTT, OF KINGSBURG, CALIFORNIA.

DIRT-SCRAPER.

SPECIFICATION forming part of Letters Patent No. 291,585, dated January 8, 1884.

Application filed April 10, 1883. (No model.)

*To all whom it may concern:*

Be it known that I, CHARLES ENDICOTT, of Kingsburg, county of Fresno, State of California, have invented an Improved Dirt-Scraper; and I hereby declare the following to be a full, clear, and exact description thereof.

My invention relates to a new and useful dirt-scraper for leveling land; and it consists in the arrangement of the bowl, wheeled axle, and the means for connecting them, the draft, and the means for dumping the bowl, which will hereinafter fully appear.

The object of my invention is to provide a simple and effective device for leveling land.

Referring to the accompanying drawing, the figure is a perspective view of my scraper.

A A are the wheels, mounted upon the ends of an axle, B.

C is a platform, the front edge of which is firmly secured to the top of the axle, while its rear end is supported by a frame formed of the rear ends of lever-arms D, which are secured to it upon each side. These arms cross the axle and are bolted to it; they extend forward and are bent outward and forward again, as shown.

E is the bowl of the scraper, provided with the usual bit, *e*. To the ends of the bowl, upon the outside, are pivoted the forward ends of the lever-arms D.

F is the pole or draft-bar, having diverging bars G, the rear ends of which are pivoted on the outside of the ends of the bowl, about their center, and preferably by the same bolts or pins which pivot the lever-arms D.

I is the operating-lever secured to the rear top center of the bowl, and braced by a bar, *i*.

The operation of the scraper is as follows: The driver stands upon the platform C, near its forward edge, as near over the axle as possible. By throwing lever I forward sufficiently the bit *e* of the bowl is made to take hold of the ground and scrape up a load. When the time of dumping arrives, the lever I is thrown farther forward and the bowl turns on its end pivots to dump its load. To raise it again, the driver moves back on the platform C, and his weight, acting through the lever-arms D and the axle B as a fulcrum, raises the bowl, so that when the lever I is drawn back to swing said bowl its bit will be free of the ground, and thus render the operation of righting it an easy one.

The pivot-points of the draft and of the lever-arms D being at or near the center of the ends of the bowl makes the operation of dumping and righting the device an easy matter.

Having thus described my invention, what I claim as new, and desire to secure by Letters Patent, is—

1. In a dirt-scraper, the wheeled axle B and the platform C, in combination with the bowl E and the lever-arms D, secured to and forming a frame behind the axle for the support of the platform, and pivoted at their forward ends to the ends of the bowl, substantially as herein described.

2. In a dirt-scraper, the wheeled axle B and platform C, in combination with the bowl E, the lever-arms D, secured to the axle, their rear ends supporting the rear of the platform and their forward ends pivoted to the bowl, and the lever I, secured to the rear top center of the bowl, substantially as herein described.

3. A dirt-scraper consisting of the wheels A, axle B, platform C, lever-arms D, pivoted bowl E, having lever I, and the pole F, having bars G, pivoted to the ends of the bowl, substantially as herein described.

In witness whereof I hereunto set my hand.

CHARLES ENDICOTT.

Witnesses:
A. C. MAYFIELD,
A. A. SMITH.